(No Model.)

W. R. WILLIAMSON.
BALE TIE.

No. 273,926. Patented Mar. 13, 1883.

Witnesses

Inventor
W. R. Williamson
by his Atty
Thos S Price

UNITED STATES PATENT OFFICE.

WILLIE R. WILLIAMSON, OF WHEELER, INDIANA, ASSIGNOR TO E. A. WILLIAMSON, OF SAME PLACE.

BALE-TIE.

SPECIFICATION forming part of Letters Patent No. 273,926, dated March 13, 1883.

Application filed August 21, 1882. (No model.)

*To all whom it may concern:*

Be it known that I, WILLIE R. WILLIAMSON, of Wheeler, county of Porter, State of Indiana, have invented a new and Improved Bale-Tie; and I hereby declare the following specification, with the accompanying drawings, forming a part of the same, to be a full and complete description thereof.

The object of my invention is to provide a cheap and efficient bale-tie which can be adjusted or secured quickly, and when thus adjusted fully take up and permanently hold all the slack of the tie and retain the bale in its smallest compressed condition.

Its novelty consists in arranging a device to the loop end of the tie, by which the adjustable end is secured thereto, and when drawn taut is thoroughly locked to the loop end by forming two sharp bends in the adjustable end of the tie.

Figure 1:
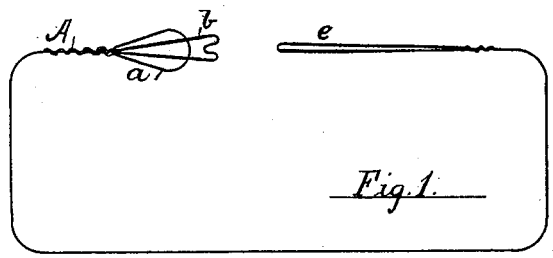
Figure 2:
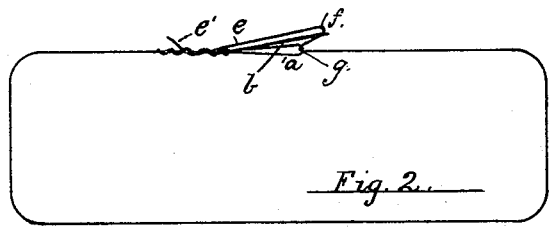
Figure 3:
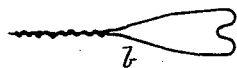
Figure 4:
Figure 5:
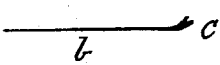

In the accompanying drawings, Figure 1 is a plan view of my bale-tie as it appears ready for use. Fig. 2 shows the tie as it appears when secured around the bale, but not showing the bale. Fig. 3 represents the form of the stay-bar constructed of wire. Fig. 4 is a top view of the stay-bar made of sheet metal. Fig. 5 represents a side view of the stay-bar of sheet metal.

In baling hay or other similar material for transportation long distances, by railroad or other conveyance, it is important that the material be compressed into the smallest practical compass, on account of the limit to shipping-space as compared to weight, or the ratio of space to cost of transportation; also, as each degree of compression applied to the bale represents a certain amount of cost, it is important that all the cost thus expended in condensing the bale shall be fully saved by a properly constructed and adjusted bale-tie.

The principal points in the construction of bale-ties are, first, cheapness of construction; second, facility of application to the bale; third, the reliability and permanence with which the bale is held in its compressed form. All these objects are fully attained in the following-described construction:

Wire of the smallest diameter that is suitable for the size of bale or degree of compression desired, in length a little more than required to span the bale, is selected, and on one end an eye or loop is formed by bending the wire back upon itself and twisting the end around the tie A, Fig. 1. Upon this loop a stay-bar, Fig. 3 or 4, is secured, being woven into the twisted end of the loop or properly secured thereto. This stay-bar may be made of cast or malleable metal or blanked pieces of sheet metal, or may be constructed of proper-sized wire, Fig. 3, looped, and woven into the twist of the looped end of tie, as shown at $b$, Fig. 1. The stay-bar, when secured upon the loop, has its outer end extended beyond the end of the loop, as at $b$, Fig. 1. If the stay-bar is constructed of a flat piece of sheet metal, the outer end is bent upward, as shown at $c$, Fig. 5, to facilitate the securing of the adjusted end of the tie thereto. The loop is formed a little wider than the stay-bar, as seen at $a$, Fig. 1, to allow the adjustable end of the tie to be passed through the loop and drawn taut without interference by the stay-bar. When small wire is used the adjustable end of the tie may be doubled by bending the wire back upon itself, $e$, Fig. 1, to secure a greater degree of stiffness for the purpose of facilitating, handling, and threading this end into the loop.

In applying this tie, after being passed around the bale, the adjustable end is drawn through the loop and up by the side of the stay-bar, and when the bale is under pressure the adjustable end is drawn taut and back over the loop, and then bent forward over the end of the stay-bar, (see Fig. 2,) forming two sharp bends in the adjustable end of the tie $f$ and $g$, Fig. 2, near each other, around the loop and over the stay-bar, securely locking the adjustable end of the tie to the loop end thereof. After the tie is thus secured the adjustable end may be drawn under the loop to prevent its being caught when handling the bale $e\ e'$, Fig. 2.

Bale-ties heretofore constructed which have their ends locked, merely, fail to take up the slack, and those ties, also, which are secured by drawing the adjustable end through the loop, and then made fast by twisting the end back upon itself, require the operator to hold the tie away from the bale to make room to form the twist. In this operation a slack is made in the tie, which, with the loose end of the twist, allows the bale to expand. My tie, however, which takes up and holds all the slack, will secure and hold the bale three or four inches shorter than those secured as above described. This economy of space is very important in the saving of shipping expenses.

The construction of this tie will allow its being taken from the bale without injury and used again for the same purpose.

The operator can handle this tie with gloves or mitts on with equal facility in cold weather, or when the fingers become tender by constant handling the wire.

It will be seen in this tie that the wire is bent only partly around the loop, and is therefore not so likely to break as those ties that require the wire bent entirely around the loop.

I have put this bale-tie to thorough practical test, and find it fills all the requirements herein claimed in a complete and satisfactory manner.

In baling cotton or other similar material, should it be desired to use flat iron bands in lieu of wire, the same construction can be used by securing a loop having a straight bearing the width of the band to the loop end of the tie and a stay-bar thereon, substantially as herein described.

I claim as my invention—

1. A bale-tie provided with a stay-bar for the purpose of securing the adjustable end of the tie to the opposite or looped end thereof, substantially as herein provided and set forth.

2. In a bale-tie, the combination of a loop and stay-bar, to which the adjustable end of the tie is secured by bending said adjustable end upon the said loop and stay-bar, substantially as shown, and herein described.

3. The combination of a bale-tie having a looped end with the stay-bar, arranged to lock the adjustable end thereto by bending said adjustable end through the loop and over the stay-bar, substantially as shown and set forth.

WILLIE R. WILLIAMSON.

In presence of—
  RUFUS KING,
  THOS. S. PRICE.